(No Model.)

J. N. BITTING.
Bearing for Shafts and Axles.

No. 230,994. Patented Aug. 10, 1880.

WITNESSES
Harry Smith
Henry Howson Jr.

INVENTOR
Joseph N. Bitting
by his Attorneys.
Howson & Son

UNITED STATES PATENT OFFICE.

JOSEPH N. BITTING, OF CAMDEN, NEW JERSEY.

BEARING FOR SHAFTS AND AXLES.

SPECIFICATION forming part of Letters Patent No. 230,994, dated August 10, 1880.

Application filed March 12, 1880. (No model.)

*To all whom it may concern:*

Be it known that I, JOSEPH N. BITTING, a citizen of the United States, residing in Camden, in the county of Camden and State of New Jersey, have invented an Improved Bearing for Shafts and Axles, of which the following is a specification.

The object of my invention is to so construct the bearing of a shaft or axle as to reduce the friction on said shaft or axle without materially impairing the firmness or strength of the bearing.

Figure 1:
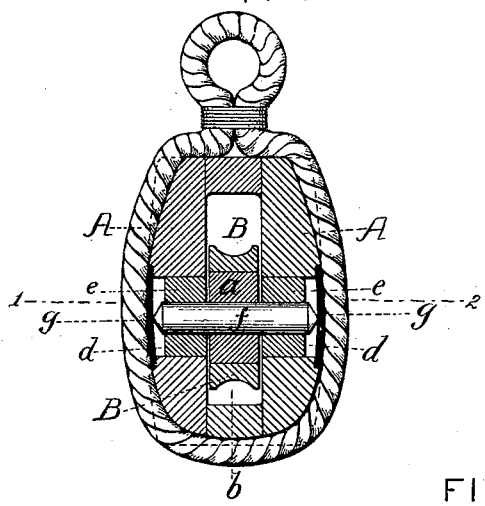
Figure 2:
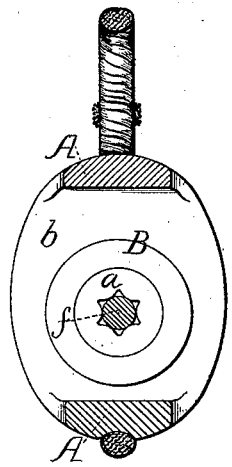
Figure 3:
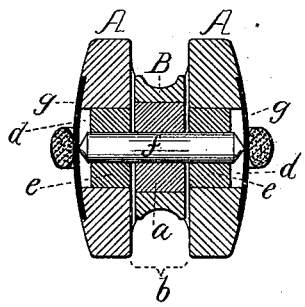

In the accompanying drawings, Figure 1 is a transverse section of a pulley-block the sheave-axle of which is adapted to bearings constructed according to my invention; Fig. 2, a longitudinal section, and Fig. 3 a sectional plan.

A represents the body of the block, which is made in sections, as usual, B being the sheave, having a central opening to which is fitted a bearing-ring, $a$, adapted to the axle $f$, the latter being also adapted to rings $e$, similar to the ring $a$, and fitted to lateral openings $d$, which extend from the central sheave-opening, $b$, to the opposite sides of the block.

As shown in the drawings, the sheave is free to turn on the axle $f$, and the latter is also free to turn in the bearings $e$, lateral displacement of the axle being prevented by plates $g$, which are secured to the opposite sides of the block, so as to cover the openings $d$.

This construction forms no part of my invention, however, the said invention relating to the construction of the bearings $a$ and $e$.

It will be observed on reference to Fig. 2 that the central opening of the bearing-ring $a$ is bounded by a series of segmental lugs, (six in the present instance,) and that the crowns of these segmental lugs form the bearings for the axle $f$, so that the frictional surface exposed to said axle is very limited, whereby the free turning of the sheave on the axle and of the axle in the bearings $e$ is insured, the spaces between the segments serving as oil-receptacles and providing for the proper lubrication of the axle at all times.

If desired, the sheave or wheel may be secured to the axle $f$, the latter in this case simply turning in the bearings $e$ as the sheave or wheel is rotated; or the axle may be secured to the bearings $e$ and the sheave or wheel rotate thereon.

While the frictional surface in my improved bearing is very small, the bearing is extremely rigid, as the segments are cast integral with the bearing ring or box, and it is in this respect that my invention differs essentially from that class of bearings having anti-friction rollers, the bearings of which are liable to become crushed when subjected to heavy strains.

The segmental lugs are much more durable than V-shaped lugs would be, as said segmental lugs do not present any sharp points to be rapidly worn away by the friction to which they are subjected.

Having thus described my invention, what I claim, and desire to secure by Letters Patent, is—

The within-described bearing for shafts or axles, said bearing consisting of a ring or box, $a$, the central opening of which is bounded by a series of segmental lugs, against the crowns of which the said shaft or axle has its bearing, all substantially as set forth, said lugs being formed integral with the box or ring, as specified.

In testimony whereof I have signed my name to this specification in the presence of two subscribing witnesses.

JOSEPH N. BITTING.

Witnesses:
JAMES F. TOBIN,
HARRY SMITH.